(12) United States Patent
Cano et al.

(10) Patent No.: US 8,477,406 B2
(45) Date of Patent: Jul. 2, 2013

(54) METHOD FOR MAKING ENCLOSURES FILLED WITH LIQUID AND CLOSED BY A MEMBRANE

(75) Inventors: Jean-Paul Cano, Charenton-le-pont (FR); Anthony Saugey, Charenton-le-pont (FR); Laurence Clerc, Brie et Angonnes (FR)

(73) Assignees: Commissariat a l'Energie Atomique et aux Energies Alternatives (FR); Essilor International (Compagnie Generale d'Optique) (FR)

( * ) Notice: Subject to any disclaimer, the term of this patent is extended or adjusted under 35 U.S.C. 154(b) by 247 days.

(21) Appl. No.: 13/001,615

(22) PCT Filed: Jun. 24, 2009

(86) PCT No.: PCT/EP2009/057870
§ 371 (c)(1),
(2), (4) Date: Apr. 14, 2011

(87) PCT Pub. No.: WO2010/003821
PCT Pub. Date: Jan. 14, 2010

(65) Prior Publication Data
US 2011/0180944 A1     Jul. 28, 2011

(30) Foreign Application Priority Data
Jun. 27, 2008  (FR) .................... 08 54335

(51) Int. Cl.
*G02B 26/00* (2006.01)
*B29C 39/10* (2006.01)

(52) U.S. Cl.
USPC .......................................... 359/296; 428/68

(58) Field of Classification Search
USPC ............... 359/296, 900; 430/32, 38; 204/600, 204/450; 264/4; 428/68, 337, 500; 427/162; 345/105, 107; 349/187, 86, 190; 156/145, 156/324, 272.2
See application file for complete search history.

(56) References Cited

U.S. PATENT DOCUMENTS 3,863,249 A    1/1975   Olah
3,978,580 A    9/1976   Leupp et al.
(Continued)

FOREIGN PATENT DOCUMENTS

CH    591090    9/1977
EP    0782037   7/1997
(Continued)

OTHER PUBLICATIONS

R. Buestrich et al., ORMOCERs for Optical Interconnection Technology, Journal of Sol-Gel Science & Technology, 20, 181-186, 2001.
(Continued)

Primary Examiner — Tuyen Tra
(74) Attorney, Agent, or Firm — Baker & Hostetler LLP

(57) ABSTRACT

The present invention relates to a method for making a device provided with at least one closed enclosure filled with at least one liquid and closed with at least one flexible membrane based on an elastic material, comprising the steps of:
  a) depositing on a support (100) at least one given material in liquid form,
  b) at least partly solidifying said given material (130),
  c) depositing at low pressure an elastic material onto said solidified material so as to form a membrane, the membrane and the support forming at least one closed enclosure filled with said given material,
  d) melting said given material (130), so as to again liquefy said given material in the closed enclosure.

20 Claims, 3 Drawing Sheets

U.S. PATENT DOCUMENTS

| | | | |
|---|---|---|---|
| 4,989,226 | A | 1/1991 | Woodbury et al. |
| 5,417,801 | A | 5/1995 | Bol |
| 5,838,414 | A | 11/1998 | Lee |
| 6,063,653 | A | 5/2000 | Lin et al. |
| 6,525,865 | B2 * | 2/2003 | Katase .......................... 359/296 |
| 6,947,202 | B2 | 9/2005 | Liang et al. |
| 6,958,207 | B1 | 10/2005 | Khusnatdinov et al. |
| 7,136,216 | B1 | 11/2006 | Daniel et al. |
| 7,374,634 | B2 * | 5/2008 | Wang et al. .................... 156/277 |
| 2003/0076609 | A1 | 4/2003 | Kawase |
| 2004/0029303 | A1 | 2/2004 | Hart et al. |
| 2004/0161201 | A1 | 8/2004 | Souriau |
| 2004/0165252 | A1 | 8/2004 | Liang et al. |
| 2005/0275072 | A1 | 12/2005 | Haluzak et al. |
| 2006/0006336 | A1 | 1/2006 | Cano et al. |
| 2006/0275711 | A1 | 12/2006 | Fu |
| 2007/0029277 | A1 | 2/2007 | Jacobowitz et al. |
| 2008/0037104 | A1 | 2/2008 | Hagood et al. |
| 2008/0123045 | A1 | 5/2008 | Jeng et al. |
| 2008/0212017 | A1 | 9/2008 | Ballet et al. |
| 2008/0212023 | A1 | 9/2008 | Bovet et al. |
| 2009/0027767 | A1 | 1/2009 | Souriau et al. |
| 2009/0246546 | A1 | 10/2009 | Keppner et al. |
| 2009/0316110 | A1 | 12/2009 | Cano et al. |
| 2010/0014036 | A1 | 1/2010 | Caplet |

FOREIGN PATENT DOCUMENTS

| | | |
|---|---|---|
| EP | 0977076 | 2/2000 |
| EP | 1672394 | 6/2006 |
| EP | 1722424 | 11/2006 |
| EP | 1791197 | 5/2007 |
| FR | 2872589 | 7/2004 |
| FR | 2879757 | 12/2004 |
| FR | 2888948 | 7/2005 |
| FR | 2888953 | 7/2005 |
| FR | 2897164 | 2/2006 |
| GB | 2435717 | 9/2007 |
| JP | 2002-323630 | 6/2004 |
| WO | 99/45143 | 9/1999 |
| WO | 02/065215 | 8/2002 |
| WO | 02/088671 | 11/2002 |
| WO | 03/021346 | 3/2003 |
| WO | 2006/052763 | 5/2006 |
| WO | 2006/067309 | 6/2006 |
| WO | 2006/067650 | 6/2006 |
| WO | 2006/116616 | 11/2006 |
| WO | 2007/090828 | 8/2007 |
| WO | 2007141525 | 12/2007 |
| WO | 2010003821 | 1/2010 |

OTHER PUBLICATIONS

W.S. O'Shaughnessy et al., Stable Biopassive Insulation Synthesized by Initiated Chemical Vapor Deposition of . . . , Biomacromolecules, 2007, 8, pp. 2564-2570.

Chiung-Wen Kuo et al., Monolithic integration of well-ordered nanoporous structures in the microfluidic channels for bioseparation, Journal of Chromatography, Aug. 2007.

S. Cheylan et al., Optical study of polymer infiltration into porous Si based structures, Proceedings of SPIEE, May 2007.

NUNC: Tapes, Lids and Mats, Announcement Nunc International, Jan. 2006.

M. Trejo-Valdez et al., Aerosol-gel deposition of photocurable ORMOSIL films doped with a terbium complex, Optical Materials, 25, (2004) 179-184.

Y. Nishijima et al., Inverse silica opal photonic crystals for optical sensing applications, Optics Express, 15(20), I2979, 2007.

San Ming Yang, et al., Opal Circuits of Light—Planarized Microphotonic Crystal Chips, Advanced Functional Materials, 12, 425, 2002.

Matthieu Liger, et al., Robust Parylene-To-Silicon Mechanical Anchoring, MEMS-3, IEEE, Micro Electro Mechanical Systems, the Sixteenth Annual International Conference, Jan. 19-23, 2003, pp. 602-605.

* cited by examiner

METHOD FOR MAKING ENCLOSURES FILLED WITH LIQUID AND CLOSED BY A MEMBRANE

TECHNICAL FIELD

The invention relates to the making of devices comprising one or more cavities or enclosures filled with a liquid and at least partly closed with a membrane.

It notably applies to the field of optics for making optical lenses or optical glasses, or matrices of glasses or lenses, in other fields such as that of MEMS or NEMS (MEMS/NEMS for micro- or nano-systems, electromechanical systems), for making actuators, sensors or switches, as well as in that of microfluidic devices in the biomedical field.

More particularly, the invention relates to the method for closing such enclosures.

STATE OF THE PRIOR ART

For certain applications, notably optical applications, it is possible to seek sealed encapsulation of a liquid, a so-called <<functional liquid>> in cavities or in enclosures with a critical size of the order of several µm to several hundred µm.

These micro-cavities may be obtained by various techniques, notably by micro-machining of a substrate and by deposition and structuration of one or more layers with etching and photolithographic techniques.

By <<functional liquid>> is meant a liquid formed with one or more substances selected for their specific properties, for example their optical properties.

Document EP 1 672 394 proposes a method for making a closed and flexible enclosure, filled with liquid, by covering with an elastic membrane a volume of liquid deposited on a substrate.

In this method, the elastic membrane is directly formed on the liquid by low pressure deposition of an elastic material, poly-para-xylylene, still commonly called Parylene®. This material polymerizes at room temperature so as to form a uniform layer following the surface on which it is deposited.

Because of the pressure at which such a closing method is performed, this method has as a major drawback that the liquid tends to evaporate during the formation of the membrane.

Another significant difficulty lies in the fact that mixing or chemical reaction of the deposited material towards the liquid(s) is likely to occur.

An object of the invention is to propose a method which allows closure of cavities filled with a liquid in an efficient and industrial way, and which does not have the aforementioned drawbacks.

DISCUSSION OF THE INVENTION

The present invention relates to a method for making a device provided with at least one closed enclosure filled with at least one liquid and closed with at least one membrane, comprising the steps of:

a) depositing on a support at least one given material in liquid form, b) at least partly solidifying said given material or placing the given material in the form of a gel, c) making the membrane on said solidified given material, the membrane and the support forming at least one closed enclosure filled with said given material, d) melting said given material, so as to again liquefy said given material in the closed enclosure.

The membrane may be formed by depositing an elastic material.

According to a possible embodiment, the elastic material may be based on poly-para-xylylene and/or on its derivatives, this material family being known as Parylene®.

The material used for forming the membrane may be deposited or have to be deposited at low pressure. By deposition at <<low pressure>>, is meant that the deposition may be carried out at a pressure comprised between 1 and 500 mTorrs, or between 10 and 50 mTorrs.

By depositing the membrane on a solidified liquid material or on a gel, the problems of evaporation of the liquid are notably avoided.

The deposition of the membrane may be carried out at a temperature comprised between −196° C. and 80° C., or between −30° C. and 40° C.

This temperature may be adjusted depending on the temperature below which the material present in the cavities is capable of gelling or of partly or totally solidifying on the one hand and on a temperature above which the device being made would risk being deteriorated.

By depositing parylene at a temperature for which the given material is maintained in the solid state, it is possible to obtain a higher deposition rate than that of a deposition as practiced in the prior art on a liquid material.

The given material may be selected from the following materials: a liquid crystal for example such as pentyl cyanobiphenyl (5CB), an ionic liquid, for example such as an imidazolium, pyrrolidinium, pyridinium salt, a mineral oil, for example an oil of the Isopar® range produced by Exxon Chemicals or an oil used in printing ink (of the ink jet type or of the so-called <<offset>> type), a silicone oil, a thermoreversible gel based on a liquid and on a gelling agent for example from the family of organogels.

The step for melting or transforming the given material again into the liquid state, may be carried out at room temperature or at a temperature comprised between −20° C. and 80° C.

This step may take place at a temperature of several ° C. to 10° C., above the melting temperature of the material present in the cavities.

The temperature for melting or transforming the given material again into the liquid state is selected so as not to degrade the whole of the device being made.

According to a possible embodiment, the support may include several separate cavities.

In this case, step a) may include the filling of at least one or more of said cavities with said given material, the membrane formed in step c) and the cavities forming several closed separate enclosures filled with said given material.

According to another possibility, the step a) may include the filling of at least one cavity with said given material and the filling of at least one cavity with another given liquid material, step b) further including the at least partial solidification of said other given material, the membrane formed in step c) and the cavities forming several closed enclosures filled with different liquids.

SHORT DESCRIPTION OF THE DRAWINGS

Other features and advantages of the invention will become more clearly apparent upon reading the following description and with reference to the appended drawings, given only as an illustration and by no means limiting.

Figure 1A:
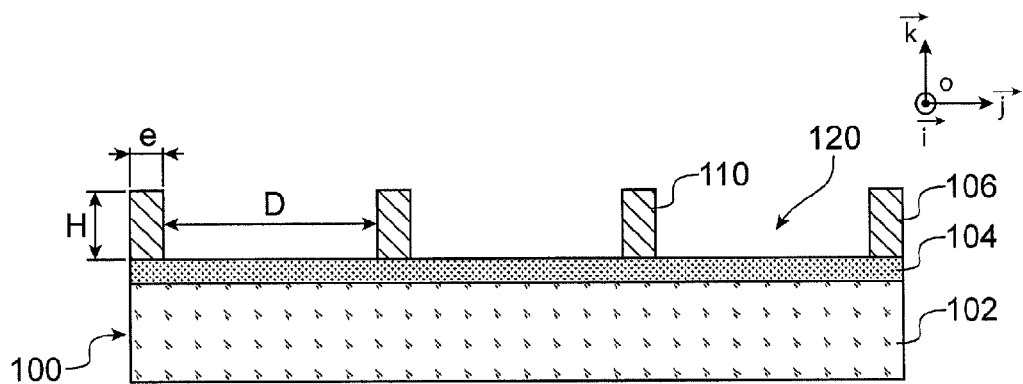
FIGS. 1A-1H illustrate an exemplary method according to the invention.
Figure 1B:
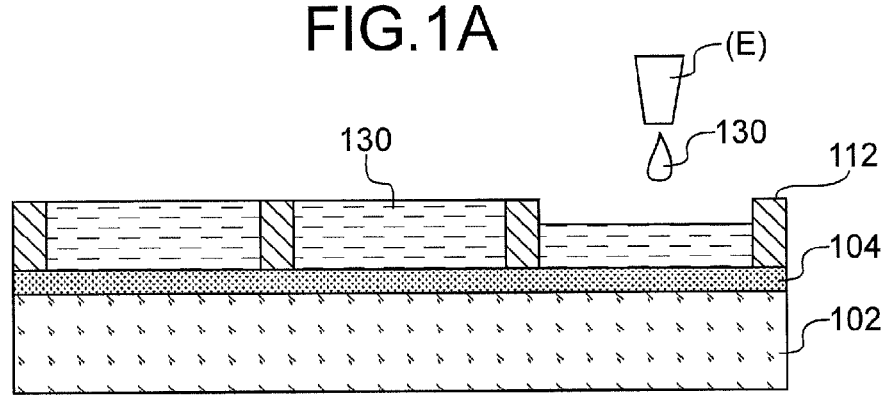
Figure 1C:
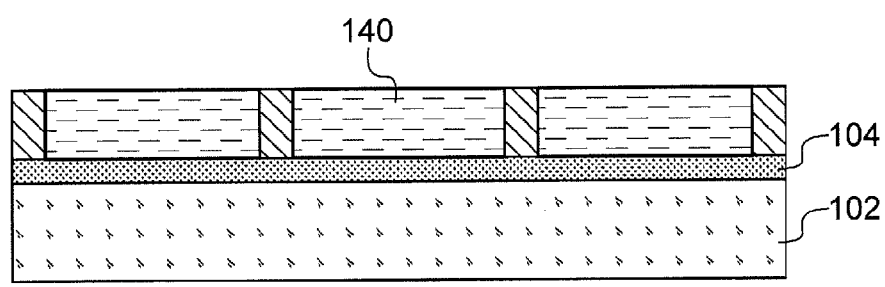
Figure 1D:
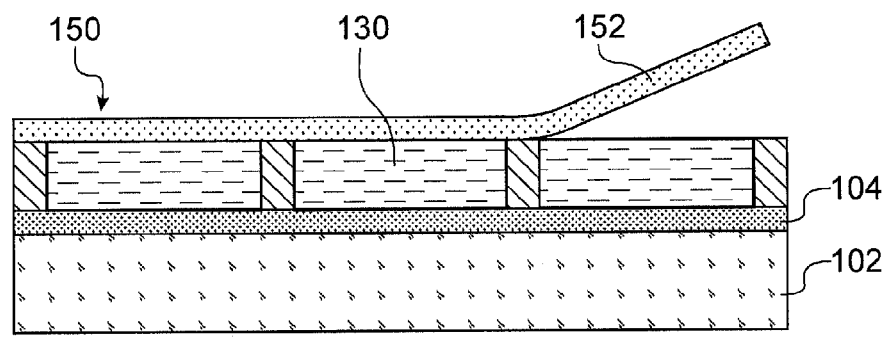
Figure 1E:
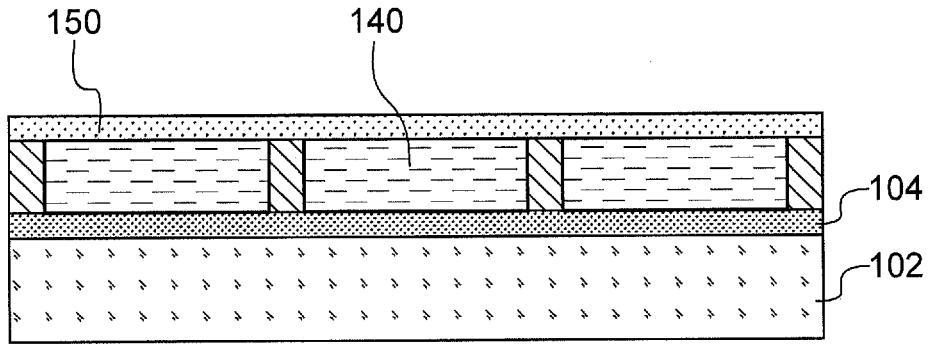
Figure 1F:
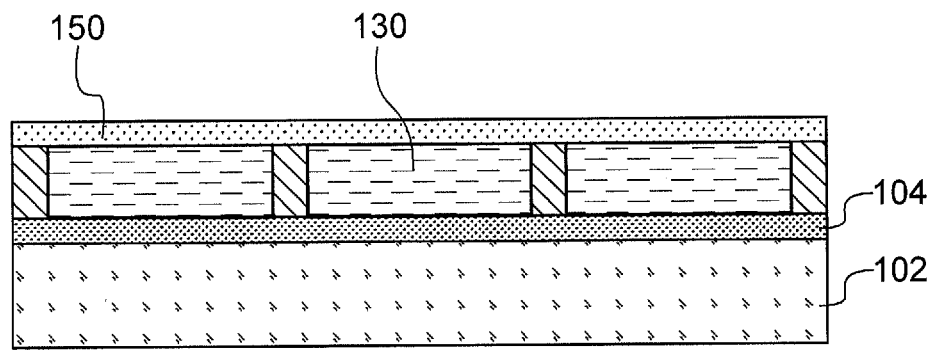
Figure 1G:
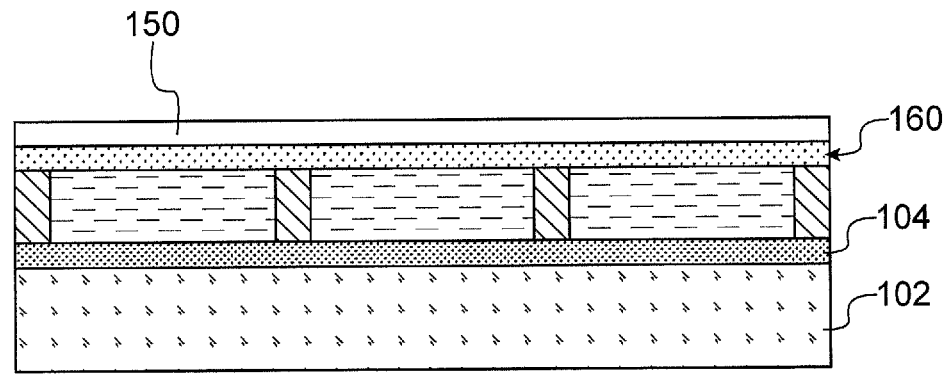

Identical similar or equivalent parts of the different figures bear the same numerical references so as to facilitate passing from one figure to the other.

The different parts illustrated in the figures are not necessarily illustrated according to a uniform scale, in order to make the figures more legible.

DETAILED DISCUSSION OF PARTICULAR EMBODIMENTS

An exemplary method according to the invention, for making a device including one or more enclosures filled with at least one liquid and closed with at least one membrane, will now be given in connection with FIGS. 1A-1H.

On a planar support 100, first of all, one or more cavities 120 or containers 120 or enclosures 120, each cavity 120 being laterally delimited by walls 110 formed in one or more thin layers, as well as at the bottom, by a layer of the support. The walls 110 of the cavities 120 may be distributed so as to give the latter a shape in the plane of the substrate which may be according to several examples: circular, oval, square, rectangular, polygonal or star-shaped. The walls 110 separating the cavities 120 ensure their mutual seal.

The support 100 may be transparent, and for example in the form of a glass slab or of a plastic material such as a polyethylene terephthalate (PET) layer.

According to one possibility (FIG. 1A), the support 100 may be formed with a substrate 102, for example in glass, on which one or more thin layers are formed, for example at least one layer 104 of flexible material, based on polyethylene terephthalate (PET). An intermediate adhesive layer, for example based on acrylate, may optionally be provided for having the layer 104 adhere to the substrate 102.

The cavities 120 may be made, by depositing a layer 106 on the support 100, and then by etching this layer 106 so as to delimit the locations of the walls 110. The layer 106 in which the cavities 120 are defined may for example be a layer of photosensitive resin. The making of the cavities 120 may at least comprise one photolithographic step.

According to another possibility, the cavities 120 may be formed with a method in which a layer 106 is formed on the support, and the locations of the cavities 120 are then made by stamping, with a mold provided with protruding patterns which are applied by pressing on the layer 106.

Alternatively, a layer 106 of polymeric material may be deposited on the substrate 102 and then this layer 106 may be locally etched through a mask, for example by RIE or high density plasma etching with a mixture of $O_2$, with a fluorinated gas of the $SF_6$ and/or $CHF_3$ type.

According to another possibility, the layer 106 may be formed by lamination on a substrate 102 of a polymeric material layer in which the cavities 120 have been made beforehand, for example by etching.

The size and the localization of the walls 110 depend on the intended application for the device. For an optical application, in particular for making lenses, the walls 110 may be formed according to a geometry intended for not bringing about any perturbation or bringing about negligible or non-visible perturbations, on the path of the light rays crossing the support 100. The walls 110 may be formed on the basis of a transparent resin and in which patterns may be made by photolithography, for example a resin based on ORMOCER®, for example as described in document: <<ORMOCER® for Optical Interconnection Technology>>, R. Buestrich, F. Kahlenberg, M. Popall et al., Journal of Sol-Gel Science and Technology 20, 181-186, 2001.

The walls 110 separating the cavities 120 may have a thickness e defined in a direction parallel to the main plane of the substrate or support (defined in FIG. 1A in a plane parallel to the plane [O; $\vec{i}$; $\vec{j}$] of an orthogonal reference system [O; $\vec{i}$; $\vec{j}$; $\vec{k}$] defined in FIG. 1A) for example comprised between 0.1 μm and 5 μm, or between 1 and 3 μm.

The walls 110 may also have a height H (H being defined in FIG. 1A in a direction parallel to the vector $\vec{k}$ of the orthogonal reference system [O; $\vec{i}$; $\vec{j}$; $\vec{k}$] comprised for example between 5 and 50 μm, or between 10 and 30 μm.

The cavities 120 may also have a diameter or a side or a length D (defined in a direction parallel to the plane [O; $\vec{i}$; $\vec{j}$] of the orthogonal reference system [O; $\vec{i}$; $\vec{j}$; $\vec{k}$] comprised for example between 5 μm and 500 μm or between 50 μm and 300 μm.

Next, (FIG. 1B), filling of the cavities 120 is carried out with a given liquid material or with several given liquids. In the case of an application to an optical device, the given material may be a liquid, a so-called <<functional liquid>>, i.e. selected for specific properties, for example such as refractive index, light absorption capacity, polarization, response to electric or light stimuli.

The given liquid material may for example be 1-butyl-3-methylimidazolium acetate capable of being solidified at a temperature of the order of −20° C.

According to another example, the given material may be paraffin oil of the Nujol® type from Plough capable of being solidified at a temperature of the order of −40° C.

According to still another example, the given material may be a mixture of 2,3-bis-n-decyloxyanthracene (DDOA) in 1-octanol, capable of being gelled or transformed into the form of a gel at a temperature comprised between 20 and 40° C.

By gel, is meant a body stemming from the solidification of colloidal substances or else a continuous solid lattice surrounding a continuous liquid phase.

The filling may be carried out by a piece of equipment E aiming at the inside of the cavities 120 and projecting the liquid material 130 as a jet or as drops 132, with a volume which may be of the order of several picoliters. The liquid may be delivered with a technique adapted to localization of small volumes, i.e. several picoliters to several hundred picoliters. For filling the cavities, the piece of equipment E used may apply a technique for dispensing liquid similar to the one for dispensing with an ink jet. The liquid material 130 may partly or completely fill the cavities. A total filling of the cavities may be carried out so as to attain the top 112 of the walls 110 or to slightly jut out above the top 112 of the walls 110.

According to a possible embodiment, one or several cavities 120 may be filled with a mixture of several liquids in proportions adjusted according to the targeted application. For example, for an optical application, by providing two to several liquids including different dyes, it may be possible to adjust the optical density or the absorbance in a cavity by adapting the volumes of each of the filling liquids.

According to an exemplary application of the device, the latter may be provided for delivering at least one active ingredient. In this case, the filling of the cavities may be carried out with a liquid including active molecules and a solvent. The concentration or the dosage of the active molecules may differ according to the cavities 120. A gradation of the active ingredient concentration between the cavities of the device may thus be provided. The active ingredient may be a substance which enters the composition of a drug and which is responsible for the pharmacodynamic or therapeutic properties of the latter.

Figure 2A:
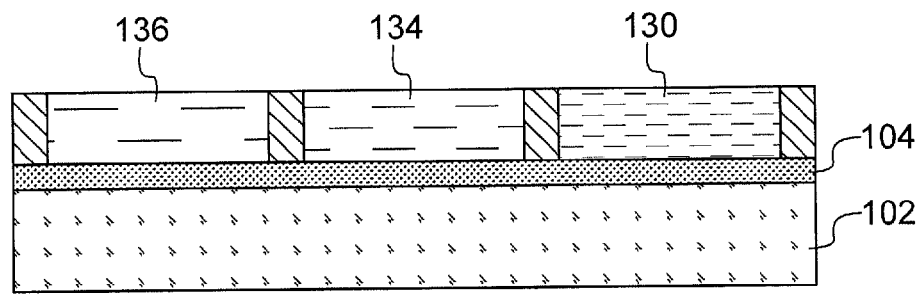
FIGS. 2A and 2B illustrate alternative embodiments.

According to another possible embodiment (FIG. 2A), several cavities 120 may also be filled with liquids 130, 134, 136 different from one cavity to the other. This may notably be applied for an optical application of the device, when it is sought to impart to the cavities, optical properties different from each other.

Figure 2B:
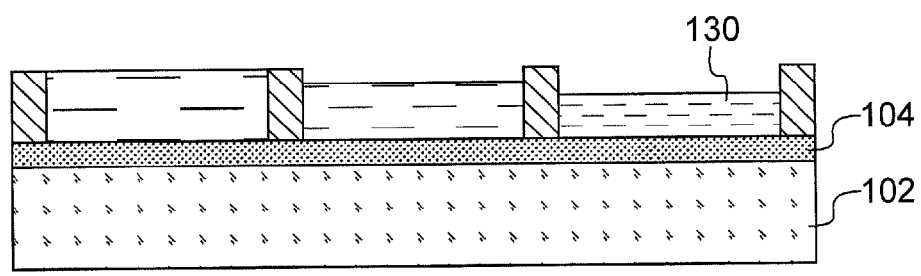

According to another possible embodiment (FIG. 2B), a different volume of liquid may be provided from one cavity to the other.

The liquid material 130 may include organic solvent(s). According to one example, the solvent used may be the glycol ether Dowanol TPM (tri-propylene glycol methyl ether).

Next, solidification (FIG. 1C) of the liquid material(s) 130 present in the cavities 120 is carried out.

Solidification may be partial so that at least the upper portion of the liquid material 130 or of the liquid present in the cavities is transformed into the solid state, or may be complete.

In order to solidify the liquid material 130 or the liquid present in the cavities 120, cooling of the liquid(s) is achieved. For this, the liquid may be brought to a temperature at least lower than or equal to the one at which the saturation pressure of the liquid material 130 present in the cavities 120 is attained or, when several liquids are present, to the one at which the smallest saturation pressure value of the liquid present in the cavities 120 is attained.

In one case, for example, when the liquid material 130 filling the cavities is 1-butyl-3-methylimidazolium acetate, the liquid may be brought to a temperature below −20° C. in order to carry out this solidification.

In another case, for example, when the solidified material 130 is a mineral oil of the lubricant type, the liquid may be brought to a temperature below −40° C. in order to carry out this solidification.

According to an alternative, the solidification step may be replaced with a step for transforming the given filling material into a gel. In this case, the given material for filling the cavities is a material capable of being transformed into a gel or formed with a mixture including a gelling component. An exemplary mixture may be formed with 2,3-bis-n-decyloxy-anthracene (DDOA) in 1-octanol. For example, for a salting-out application of an active ingredient in a biological organism, the appearance of the gel may occur, depending on the aforementioned mixture used, between 20 and 40° C. A subsequent deposition of a membrane for closing the cavities may thus be achieved at room temperature. In this case, return to the liquid state of the gel for filling the cavities 120 may be carried out at a temperature above this temperature of 40° C.

According to a possibility, the cooling step may be carried out in a deposition chamber in which a closure layer is intended to be subsequently made in the form of a membrane, which may be elastic or flexible.

In this case, a system for cooling the device is provided in the deposition chamber. Such a system may for example comprise a platinum and Peltier effect module or a sample holder with a system for circulating liquid nitrogen.

A technique for cooling the rear of the support 100 with helium or a heat transfer gas may also be applied.

Cooling may also be provided by an enclosure with circulation of a heat transfer fluid, the deposition chamber being pressurized with a neutral gas toward the liquid 130.

A vacuum pumping system may also be provided in the deposition chamber in order to avoid condensation phenomena.

The support 100 may be placed at room temperature in the deposition chamber, a dry and neutral gas toward the liquid being first of all introduced at a pressure which is close to ambient pressure. In order to carry out solidification, cooling is then performed in order to attain the desired solidification, which may be partial or at the surface or complete.

For this, the deposition chamber may be brought to a temperature of the order of −20° C. or −30° C. A temperature located in such a range allows solidification of standard ionic liquids such as for example 1-butyl-3-methylimidazolium acetate, 1-butyl-3-methylimidazolium methylsulfate or 1-butyl-3-methylimidazolium thiocyanate. These temperature values are given as an indication, the temperature of the chamber or of the substrate holder being adapted to the liquid present in the cavities in order to solidify it partly or completely.

At the end of the solidification step, the given material located in the cavities is in the form of a solid 140 or is solid at the surface.

Next, (FIGS. 1D and 1E) deposition of a closure layer 150 is carried out on the top 112 of the walls 110 and on the surface of the given material 140, solidified or transformed into a gel. The closure layer 150 is provided as a flexible membrane which may be based on an elastic material and allows formation of closed cavities or closed enclosures filled with liquids. With this closure layer or membrane, the seal of the cavities may be ensured. The membrane is notably provided for making a barrier to humidity, to acids and to solvents and optionally an electrically insulating layer.

The material 152 of the closure layer 150 may be poly-para-xylylene also known as Parylene®. Such a material polymerizes at room temperature, and may be suitably formed so as to conform to the shape of the surface on which it is deposited.

The thickness of the deposited material may be uniform and comprised, according to the applications, between several nanometers and several micrometers, for example between about hundred nanometers and several tens of microns, for example between 0.2 μm and 5 μm.

The deposition of parylene with view to closure has the benefit of giving the possibility of obtaining a continuous, compliant, colorless and transparent film of small thickness, as well as good protection properties, parylene being impervious, resistant to aggressive environments, to solvents and to gases.

The deposition may be carried out in the gas phase, for example with CVD (Chemical Vapor Deposition) deposition.

Deposition of the material 152 of the closured layer 150 may be carried out under a pressure comprised between 1 and 500 mbars, or in a primary vacuum. At such a pressure, the filling liquids usually tend to evaporate. In the present case, as the liquid(s) 130 filling the cavities 120 have been at least partly solidified or transformed into a gel, evaporation phenomena do not occur.

The formation of the parylene layer may be accomplished under standard conditions, pyrolysis of di-para-xylylene is carried out beforehand at 680° C., and then polymerization of the para-xylylene monomer at the surface of the sample is carried out at a temperature allowing the given material to be maintained in the solid state. When the given solidified material is for example butyl-3-methylimidazolium acetate, 1-butyl-3-methylimidazolium methylsulfate or 1-butyl-3-methylimidazolium thiocyanate, the deposition may be carried out at a temperature comprised between −30° C. and −20° C., when the given solidified material may be maintained in the solid state.

Once the temperature of the parts having to receive the parylene deposit is attained, a vacuum may be provided in the deposition chamber.

Next, once parylene deposition is achieved and the membrane thereby formed, the temperature of the deposition chamber is again increased in order to bring back the solidified material 140 to the liquid state 130. The temperature around the device may for example be brought back to room temperature. Once melting of the material 130 is achieved, closed cavities 120 filled with liquid are formed. A device including several liquid enclosures each partly closed by an elastic material membrane and by the walls 110 of a support 100 was thereby made.

Figure 1H:
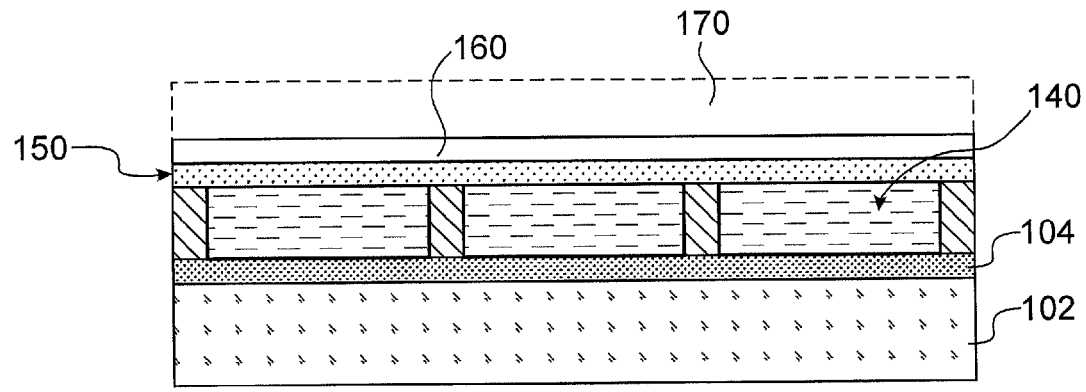

One or more additional layers 160 may be formed above the closure layer 150 (FIG. 1H). One or more additional layers 160 may be made. In order to make such (an) additional layer(s), deposition or transfer may for example be carried out by lamination. The additional layer may be a film of elastic material which may for example be identical with the layer 104, for example based on PET.

The layer 160 may then be covered with one or more functional layers (schematized by a block referenced as 170) for example having antireflection properties, or hard varnish, antifouling or antiabrasion or shockproof properties.

The substrate 102 may, as for it, be kept or, according to an alternative, separated from the flexible material layer 104.

According to a possibility, for certain applications, for example for making individual optical lenses, separation of the closed cavities 120 from each other may be carried out. The closed enclosures filled with liquid are thus dissociated or individualized.

Such a separation may for example be made with a laser, or with ultrasonic waves or with at least one cutting tool.

The method which has just been given, may be adapted to the deposition of materials other than parylene for example a transparent material such as poly(1,3,5-trivinyltrimethylcyclotrisiloxane(designated as poly(V3D3)), which may be deposited by iCVD (initiated CVD), as this is described in the article Biomacromolecules, 2007, 8, 2564-2570. The deposition temperature may be of the order of 35° C. for a deposition pressure comprised between 350 and 450 mTorrs. Such a pressure and such a temperature may possibly allow the use of a large range of possible liquids for the material given for filling the cavities 120.

Poly(1,3,5)trivinyltrimethylcyclotrisiloxane (designated as poly(V3D3)) may be deposited at a pressure and a temperature at which the given material 130 initially as a liquid may be maintained in solidified form, and is capable of returning to a liquid state at ambient pressure and temperature.

The method according to the invention may be used for making optical lenses, or matrices of lenses. In this case, said closure layer may be a parylene layer formed as described earlier, by deposition on a material which has been solidified beforehand or transformed into a gel, and may then be brought back to the liquid state after deposition so as to form said liquid of said enclosure.

The invention claimed is:

1. A method for making a device provided with at least one closed enclosure filled with at least one liquid and closed with at least one membrane, comprising the steps of:
   a) depositing on a support at least one given material in liquid form,
   b) at least partly solidifying said given material,
   c) making a membrane by low pressure deposition onto said solidified material, the membrane and the support forming at least one closed enclosure filled with said given material, and
   d) melting said given material, so as to again liquefy said given material in the closed enclosure.

2. The method according to claim 1, wherein said material forming the membrane is an elastic material.

3. The method according to claim 1, wherein said material forming the membrane is based on poly-para-xylylene and/or on at least one of its derivatives.

4. The method according to claim 1, wherein the deposition is carried out at a pressure between 1 and 500 mTorrs or in an industrial vacuum.

5. The method according to claim 1, wherein the deposition is carried out at a temperature comprised between −196° C. and 80° C.

6. The method according to claim 1, wherein the support includes several separate cavities and wherein step a) includes the filling of at least one cavity with said given material, the membrane formed in step c) and the cavities forming several separate closed enclosures filled with said given material.

7. The method according to claim 1, wherein the support includes several separate cavities and wherein step a) includes the filling of at least one cavity with said given material and the filling of at least one cavity with another given liquid material, step b) further including the at least partial solidification of said given material, the membrane formed in step c) and the cavities forming several closed enclosures filled with different liquids.

8. The method according to claim 1, said given material being selected from one of the following materials: a liquid crystal, an ionic liquid, a mineral oil, a printing ink oil, a silicone oil, a thermoreversible gel based on a liquid and a gelling agent.

9. A method for making a device provided with several separate closed enclosures filled with at least one liquid and closed with at least one membrane, comprising the steps of:
   a) filling of at least one said enclosure on a support with at least one given material in liquid form,
   b) at least partly solidifying said given material,
   c) making a membrane by low pressure deposition onto said solidified material, the membrane and the support forming several separate closed enclosures filled with said given material, and
   d) melting said given material, so as to again liquefy said given material in the closed enclosure.

10. The method according to claim 9, wherein said material forming the membrane is an elastic material.

11. The method according to claim 9, wherein said material forming the membrane is based on poly-para-xylylene and/or on at least one of its derivatives.

12. The method according to claim 9, wherein the deposition is carried out at a pressure between 1 and 500 mTorrs or in an industrial vacuum.

13. The method according to claim 9, wherein the deposition is carried out at a temperature comprised between −196° C. and 80° C.

14. The method according to claim 9, wherein the support includes several separate cavities and wherein step a) includes the filling of at least one cavity with said given material, the membrane formed in step c) and the cavities forming several separate closed enclosures filled with said given material.

15. A method for making a device provided with several separate closed enclosures filled with different liquids and closed with at least one membrane, comprising the steps of:
- a) filling of at least one said enclosure on a support with one given material and the filling of at least one enclosure with another given material, both materials being in liquid form,
- b) at least partly solidifying of said another given material,
- c) making a membrane by low pressure deposition onto said given materials, the membrane and the support forming several separate closed enclosures filled with said given materials, and
- d) melting said another given material, so as to again liquefy said given material in the closed enclosure.

16. The method according to claim 15, wherein said material forming the membrane is an elastic material.

17. The method according to claim 15, wherein said material forming the membrane is based on poly-para-xylylene and/or on at least one of its derivatives.

18. The method according to claim 15, wherein the deposition is carried out at a pressure between 1 and 500 mTorrs or in an industrial vacuum.

19. The method according to claim 15, wherein the deposition is carried out at a temperature comprised between −196° C. and 80° C.

20. The method according to claim 15, wherein the support includes several separate cavities and wherein step a) includes the filling of at least one cavity with said given material, the membrane formed in step c) and the cavities forming several separate closed enclosures filled with said given material.

* * * * *